United States Patent
Yu et al.

(10) Patent No.: US 12,328,433 B2
(45) Date of Patent: *Jun. 10, 2025

(54) REDUCING OVERHEAD FOR MULTIPLE-HYPOTHESIS TEMPORAL PREDICTION

(71) Applicant: ARRIS Enterprises LLC, Horsham, PA (US)

(72) Inventors: Yue Yu, San Diego, CA (US); Krit Panusopone, San Diego, CA (US); Limin Wang, San Diego, CA (US)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,429

(22) Filed: Mar. 5, 2024

(65) Prior Publication Data

US 2024/0214575 A1    Jun. 27, 2024

Related U.S. Application Data

(63) Continuation of application No. 17/985,782, filed on Nov. 11, 2022, now Pat. No. 11,956,445, which is a (Continued)

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/159* (2014.11); *H04N 19/174* (2014.11)

(58) Field of Classification Search
CPC .. H04N 19/137; H04N 19/105; H04N 19/159; H04N 19/174; H04N 19/139; H04N 19/176; H04N 19/573; H04N 19/109
See application file for complete search history.

(56) References Cited

U.S. PATENT DOCUMENTS 11,956,445 B2 * 4/2024 Yu .................. H04N 19/159
2011/0255600 A1 10/2011 Lin et al.
(Continued)

OTHER PUBLICATIONS

J. Chen, et al., "Algorithm Description of Joint Exploration Test Model 5 (JEM 5)", 5th JVET Meeting, Geneva, JVET-E1001-V2, Jan. 2017, 44 pgs.

*Primary Examiner* — Tracy Y. Li
(74) *Attorney, Agent, or Firm* — Chernoff, Vilhauer, McClung & Stenzel, LLP

(57) ABSTRACT

A method is provided for inter-coding video in which transmission bandwidth requirements associated with second motion vectors for bi-directional temporal prediction is reduced. In the method, vector information for one of motion vectors for multi-directional temporal prediction can be transmitted together with information on how to derive or construct the second motion vectors. Thus, rather than sending express information regarding each of the plurality of motion vectors, express information related to only one motion vector along with information related to reconstruction/derivation of the second motion vectors is transmitted, thus reducing bandwidth requirements and increasing coding efficiency.

3 Claims, 11 Drawing Sheets

Related U.S. Application Data continuation of application No. 17/225,814, filed on Apr. 8, 2021, now Pat. No. 11,533,490, which is a continuation of application No. 16/384,852, filed on Apr. 15, 2019, now Pat. No. 10,986,343.

(60) Provisional application No. 62/657,920, filed on Apr. 15, 2018.

(51) Int. Cl.
*H04N 19/159* (2014.01)
*H04N 19/174* (2014.01)

(56) References Cited

U.S. PATENT DOCUMENTS

| | | | |
|---|---|---|---|
| 2013/0022276 A1 | 1/2013 | Chen et al. | |
| 2014/0140408 A1* | 5/2014 | Lee | H04N 19/52 |
| | | | 375/240.16 |
| 2016/0295225 A1* | 10/2016 | Takano | H04N 19/43 |
| 2017/0332095 A1 | 11/2017 | Zou et al. | |
| 2018/0070105 A1* | 3/2018 | Jin | H04N 19/521 |
| 2018/0131962 A1* | 5/2018 | Chen | H04N 19/176 |
| 2019/0149838 A1* | 5/2019 | Zhang | H04N 19/176 |
| | | | 375/240.16 |
| 2019/0246103 A1 | 8/2019 | Jun et al. | |

\* cited by examiner

REDUCING OVERHEAD FOR MULTIPLE-HYPOTHESIS TEMPORAL PREDICTION

CLAIM OF PRIORITY

This Application is a continuation of U.S. patent application Ser. No. 17/985,782 filed Nov. 11, 2022, which is a continuation of U.S. patent application Ser. No. 17/225,814 filed Apr. 8, 2021, now U.S. Pat. No. 11,533,490, which is a continuation of U.S. patent application Ser. No. 16/384,852, Apr. 15, 2019, now U.S. Pat. No. 10,986,343, which claims priority under 35 U.S.C. § 119(e) from earlier filed U.S. Provisional Application No. 62/657,920, filed Apr. 15, 2018 the entirety of which is hereby incorporated herein by reference.

TECHNICAL FIELD

The present disclosure relates to the field of video coding, particularly coding efficiency increases associated with reduction in transmission of motion vector information for Bi-directional temporal prediction.

BACKGROUND

The technical improvements in evolving video coding standards illustrate the trend of increasing coding efficiency to enable higher bit-rates, higher resolutions, and better video quality. The Joint Video Exploration Team developed a new video coding scheme referred to as JVET and is developing a newer video coding scheme referred to a Versatile Video Coding (VVC)—the complete contents of the VVC $7^{th}$ edition of draft 2 of the standard titled Versatile Video Coding (Draft 2) by JVET published Oct. 1, 2018 is hereby incorporated herein by reference. Similar to other video coding schemes like HEVC (High Efficiency Video Coding), both JVET and VVC are block-based hybrid spatial and temporal predictive coding schemes. However, relative to HEVC, JVET and VVC include many modifications to bitstream structure, syntax, constraints, and mapping for the generation of decoded pictures. JVET has been implemented in Joint Exploration Model (JEM) encoders and decoders, but VVC is not anticipated to be implemented until early 2020.

Various coding techniques require that multiple motion vectors be using in the encoding and reconstruction of a coding unit. Transmission of complete information related to the multiple motion vectors is inefficient and consumes unnecessary bandwidth. What is needed is a system and method of reducing overhead and burden associated with coding involving multiple Motion Vectors (MVs).

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect comprises: receiving information regarding a coding unit; determining motion information associated with said coding unit; determining whether more than two motion vectors are associated with said motion information; determining a relationship between a first motion vector and each of a plurality of second motion vectors if it is determined that said motion information is associated with more than two motion vectors; and encoding said coding unit where said coding unit includes information related to said first motion vector and information related to said relationship between said first motion vector and each of said second motion vectors. Other embodiments of this aspect can comprise corresponding computer systems, apparatus, and computer programs recorded on one or more computer storage devices, each configured to perform the actions of the methods.

Implementations can comprise one or more of the following features: the method of inter-coding where said information related to said relationship between said first motion vector and each of said plurality of second motion vectors includes information sufficient to reconstruct an MVP index and an MVD of each of said plurality of second motion vectors; and the method of inter-coding where said information related to said relationship between said first motion vector and each of said plurality of second motions vector includes a scaling factor Implementations of the described techniques may include hardware, a method or process, or computer software on a computer-accessible medium.

General aspects can comprise: a system of inter-coding including: receiving in a first memory information regarding a coding unit, determining motion information associated with said coding unit, determining whether more than one motion vector is associated with said motion information, determining a relationship between a first motion vector and each of a plurality of second motion vectors if it is determined that said motion information is associated with more than one motion vector, and encoding said coding unit, where said coding unit includes information related to said first motion vector and information related to said relationship between said first motion vector and each of said plurality of second motion vectors. Other embodiments of this aspect can comprise corresponding computer systems, apparatus, and computer programs recorded on one or more computer storage devices, each configured to perform the actions of the methods.

Implementations can comprise one or more of the following features: the system of inter-coding where said information related to said relationship between said first motion vector and each of said plurality of second motion vectors includes information sufficient to reconstruct an MVP index and an MVD of each of said plurality of second motion vectors. Implementations of the described techniques may include hardware, a method or process, or computer software on a computer-accessible medium.

BRIEF DESCRIPTION OF THE DRAWINGS

Further details of the present invention are explained with the help of the attached drawings in which.

DETAILED DESCRIPTION

Figure 1:
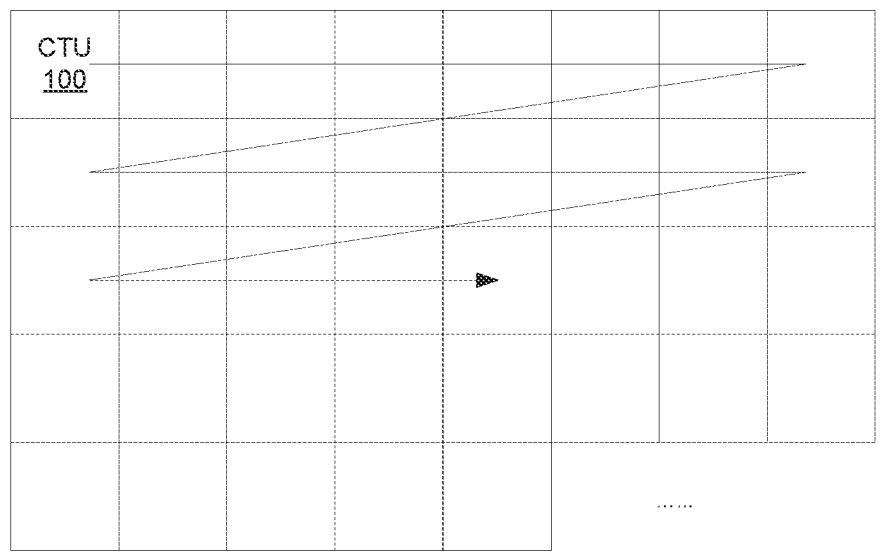
FIG. 1 depicts division of a frame into a plurality of Coding Tree Units (CTUs).

FIG. 1 depicts division of a frame into a plurality of Coding Tree Units (CTUs) 100. A frame can be an image in a video sequence. A frame can include a matrix, or set of matrices, with pixel values representing intensity measures in the image. Thus, a set of these matrices can generate a video sequence. Pixel values can be defined to represent color and brightness in full color video coding, where pixels are divided into three channels. For example, in a YCbCr color space pixels can have a luma value, Y, that represents gray level intensity in the image, and two chrominance values, Cb and Cr, that represent the extent to which color differs from gray to blue and red. In other embodiments, pixel values can be represented with values in different color spaces or models. The resolution of the video can determine the number of pixels in a frame. A higher resolution can mean more pixels and a better definition of the image, but can also lead to higher bandwidth, storage, and transmission requirements.

Frames of a video sequence can be encoded and decoded using JVET. JVET is a video coding scheme being developed by the Joint Video Exploration Team. Versions of JVET have been implemented in JEM (Joint Exploration Model) encoders and decoders. Similar to other video coding schemes like HEVC (High Efficiency Video Coding), JVET is a block-based hybrid spatial and temporal predictive coding scheme. During coding with JVET, a frame is first divided into square blocks called CTUs 100, as shown in FIG. 1. For example, CTUs 100 can be blocks of 128×128 pixels.

Figure 2A:
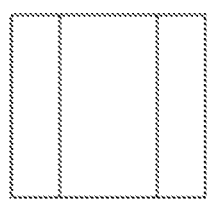
FIG. 2*a*-2*c* depict exemplary partitioning of a CTU into Coding Units (CUs).

FIG. 2a depicts an exemplary partitioning of a CTU 100 into CUs 102. Each CTU 100 in a frame can be partitioned into one or more CUs (Coding Units) 102. CUs 102 can be used for prediction and transform as described below. Unlike HEVC, in JVET the CUs 102 can be rectangular or square and can be coded without further partitioning into prediction units or transform units. The CUs 102 can be as large as their root CTUs 100, or be smaller subdivisions of a root CTU 100 as small as 4×4 blocks.

In JVET, a CTU 100 can be partitioned into CUs 102 according to a quadtree plus binary tree (QTBT) scheme in which the CTU 100 can be recursively split into square blocks according to a quadtree, and those square blocks can then be recursively split horizontally or vertically according to binary trees. Parameters can be set to control splitting according to the QTBT, such as the CTU size, the minimum sizes for the quadtree and binary tree leaf nodes, the maximum size for the binary tree root node, and the maximum depth for the binary trees. In VVC, a CTU 100 can be portioned into CUs utilizing ternary splitting also.

Figure 2B:
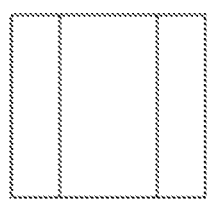
Figure 2C:
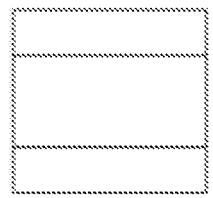

By way of a non-limiting example, FIG. 2a shows a CTU 100 partitioned into CUs 102, with solid lines indicating quadtree splitting and dashed lines indicating binary tree splitting. As illustrated, the binary splitting allows horizontal splitting and vertical splitting to define the structure of the CTU and its subdivision into CUs. FIGS. 2b & 2c depict alternate, non-limiting examples of ternary splitting of a CU wherein subdivisions of the CUs are non-equal.

Figure 3:
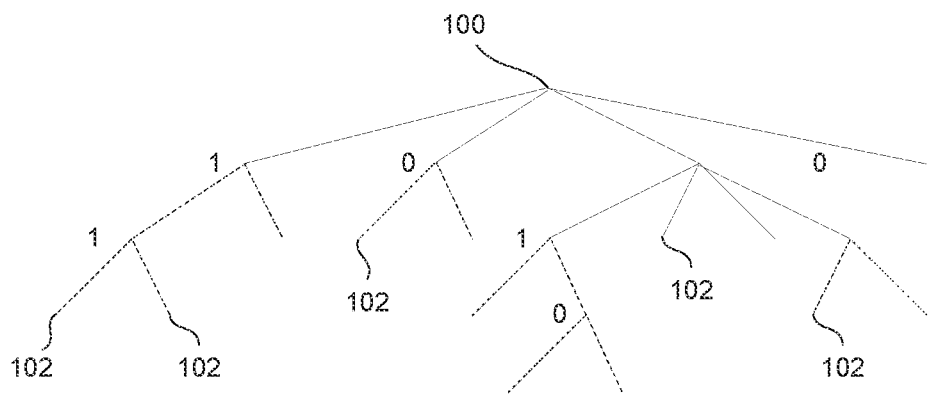
FIG. 3 depicts a quadtree plus binary tree (QTBT) representation of FIG. 2's CU partitioning.

FIG. 3 depicts a QTBT representation of FIG. 2's partitioning. A quadtree root node represents the CTU 100, with each child node in the quadtree portion representing one of four square blocks split from a parent square block. The square blocks represented by the quadtree leaf nodes can then be divided zero or more times using binary trees, with the quadtree leaf nodes being root nodes of the binary trees. At each level of the binary tree portion, a block can be divided either vertically or horizontally. A flag set to "0" indicates that the block is split horizontally, while a flag set to "1" indicates that the block is split vertically.

After quadtree splitting and binary tree splitting, the blocks represented by the QTBT's leaf nodes represent the final CUs 102 to be coded, such as coding using inter prediction or intra prediction. For slices or full frames coded with inter prediction, different partitioning structures can be used for luma and chroma components. For example, for an inter slice a CU 102 can have Coding Blocks (CBs) for different color components, such as such as one luma CB and two chroma CBs. For slices or full frames coded with intra prediction, the partitioning structure can be the same for luma and chroma components.

Figure 4:
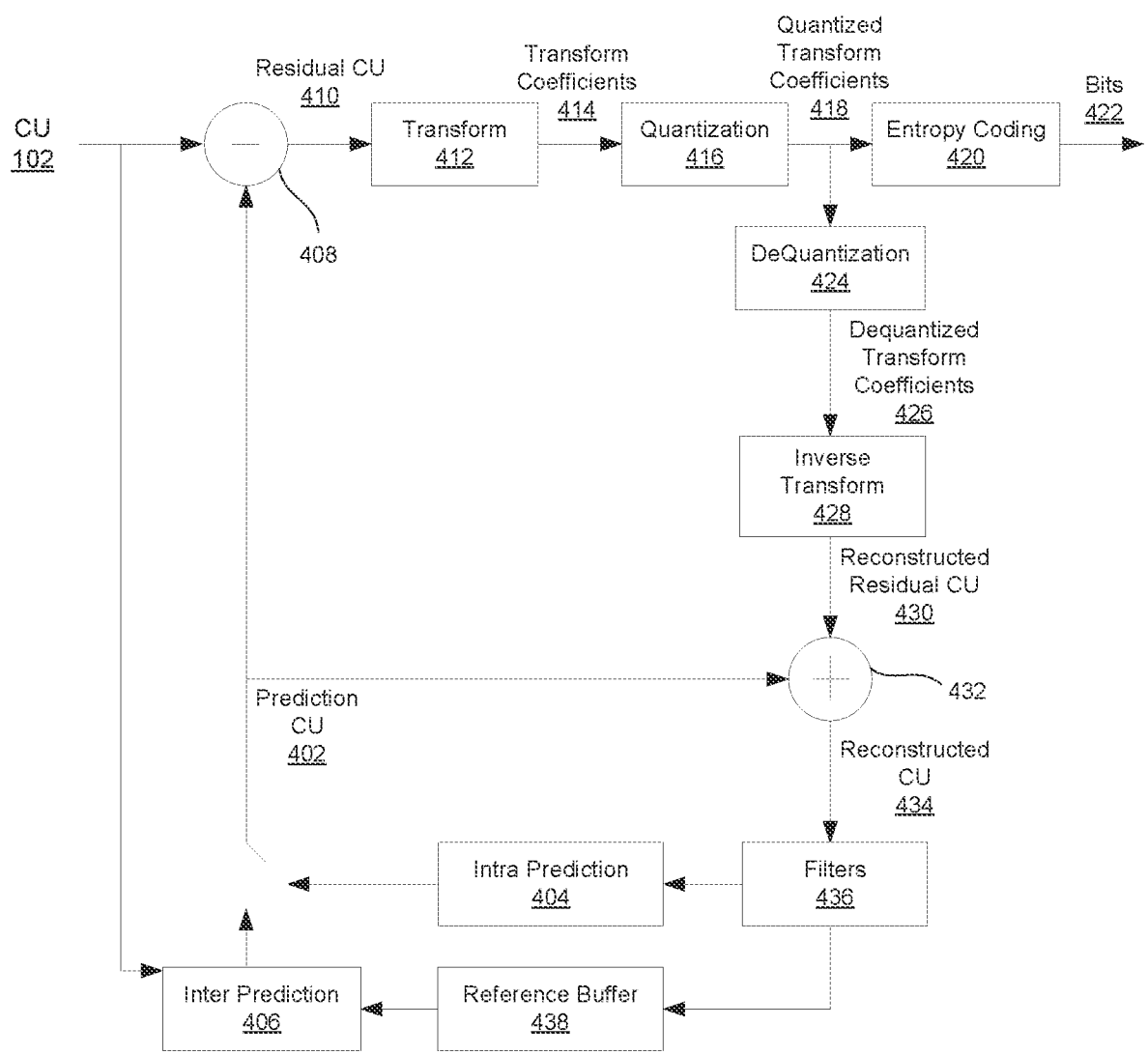
FIG. 4 depicts a simplified block diagram for CU coding in a JVET or VVC encoder.

FIG. 4 depicts a simplified block diagram for CU coding in a JVET encoder. The main stages of video coding include partitioning to identify CUs 102 as described above, followed by encoding CUs 102 using prediction at 404 or 406, generation of a residual CU 410 at 408, transformation at 412, quantization at 416, and entropy coding at 420. The encoder and encoding process illustrated in FIG. 4 also includes a decoding process that is described in more detail below.

Given a current CU 102, the encoder can obtain a prediction CU 402 either spatially using intra prediction at 404 or temporally using inter prediction at 406. The basic idea of prediction coding is to transmit a differential, or residual, signal between the original signal and a prediction for the original signal. At the receiver side, the original signal can be reconstructed by adding the residual and the prediction, as will be described below. Because the differential signal has a lower correlation than the original signal, fewer bits are needed for its transmission.

A slice, such as an entire picture or a portion of a picture, coded entirely with intra-predicted CUs can be an I slice that can be decoded without reference to other slices, and as such can be a possible point where decoding can begin. A slice coded with at least some inter-predicted CUs can be a predictive (P) or bi-predictive (B) slice that can be decoded based on one or more reference pictures. P slices may use intra-prediction and inter-prediction with previously coded slices. For example, P slices may be compressed further than the I-slices by the use of inter-prediction, but need the coding of a previously coded slice to code them. B slices can use data from previous and/or subsequent slices for its coding, using intra-prediction or inter-prediction using an interpolated prediction from two different frames, thus increasing the accuracy of the motion estimation process. In some cases P slices and B slices can also or alternately be encoded using intra block copy, in which data from other portions of the same slice is used.

As will be discussed below, intra prediction or inter prediction can be performed based on reconstructed CUs 434 from previously coded CUs 102, such as neighboring CUs 102 or CUs 102 in reference pictures.

When a CU 102 is coded spatially with intra prediction at 404, an intra prediction mode can be found that best predicts pixel values of the CU 102 based on samples from neighboring CUs 102 in the picture.

Figure 5:
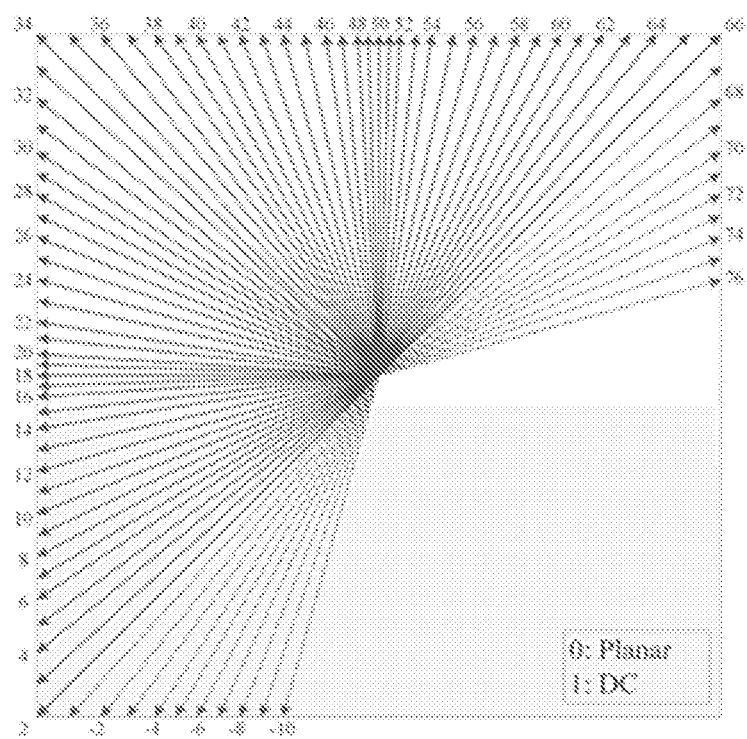
FIG. 5 depicts possible intra prediction modes for luma components in JVET of VVC.

When coding a CU's luma component, the encoder can generate a list of candidate intra prediction modes. While HEVC had 35 possible intra prediction modes for luma components, in JVET there are 67 possible intra prediction modes for luma components and in VVC there are 85 prediction modes. These include a planar mode that uses a three dimensional plane of values generated from neighboring pixels, a DC mode that uses values averaged from neighboring pixels, the 65 directional modes shown in FIG. 5 that use values copied from neighboring pixels along the solid-line indicated directions and 18 wide-angle prediction modes that can be used with non-square blocks.

When generating a list of candidate intra prediction modes for a CU's luma component, the number of candidate modes on the list can depend on the CU's size. The candidate list can include: a subset of HEVC's 35 modes with the lowest SATD (Sum of Absolute Transform Difference) costs; new directional modes added for JVET that neighbor the candidates found from the HEVC modes; and modes from a set of six most probable modes (MPMs) for the CU 102 that are identified based on intra prediction modes used for previously coded neighboring blocks as well as a list of default modes.

When coding a CU's chroma components, a list of candidate intra prediction modes can also be generated. The list of candidate modes can include modes generated with cross-component linear model projection from luma samples, intra prediction modes found for luma CBs in particular collocated positions in the chroma block, and chroma prediction modes previously found for neighboring blocks. The encoder can find the candidate modes on the lists with the lowest rate distortion costs, and use those intra prediction modes when coding the CU's luma and chroma components. Syntax can be coded in the bitstream that indicates the intra prediction modes used to code each CU 102.

After the best intra prediction modes for a CU 102 have been selected, the encoder can generate a prediction CU 402 using those modes. When the selected modes are directional modes, a 4-tap filter can be used to improve the directional accuracy. Columns or rows at the top or left side of the prediction block can be adjusted with boundary prediction filters, such as 2-tap or 3-tap filters.

The prediction CU 402 can be smoothed further with a position dependent intra prediction combination (PDPC) process that adjusts a prediction CU 402 generated based on filtered samples of neighboring blocks using unfiltered samples of neighboring blocks, or adaptive reference sample smoothing using 3-tap or 5-tap low pass filters to process reference samples.

When a CU 102 is coded temporally with inter prediction at 406, a set of motion vectors (MVs) can be found that points to samples in reference pictures that best predict pixel values of the CU 102. Inter prediction exploits temporal redundancy between slices by representing a displacement of a block of pixels in a slice. The displacement is determined according to the value of pixels in previous or following slices through a process called motion compensation. Motion vectors and associated reference indices that indicate pixel displacement relative to a particular reference picture can be provided in the bitstream to a decoder, along with the residual between the original pixels and the motion compensated pixels. The decoder can use the residual and signaled motion vectors and reference indices to reconstruct a block of pixels in a reconstructed slice.

In JVET, motion vector accuracy can be stored at 1/16 pel, and the difference between a motion vector and a CU's predicted motion vector can be coded with either quarter-pel resolution or integer-pel resolution.

In JVET motion vectors can be found for multiple sub-CUs within a CU 102, using techniques such as advanced temporal motion vector prediction (ATMVP), spatial-temporal motion vector prediction (STMVP), affine motion compensation prediction, pattern matched motion vector derivation (PMMVD), and/or bi-directional optical flow (BIO).

Using ATMVP, the encoder can find a temporal vector for the CU 102 that points to a corresponding block in a reference picture. The temporal vector can be found based on motion vectors and reference pictures found for previously coded neighboring CUs 102. Using the reference block pointed to by a temporal vector for the entire CU 102, a motion vector can be found for each sub-CU within the CU 102.

STMVP can find motion vectors for sub-CUs by scaling and averaging motion vectors found for neighboring blocks previously coded with inter prediction, together with a temporal vector.

Affine motion compensation prediction can be used to predict a field of motion vectors for each sub-CU in a block, based on two control motion vectors found for the top corners of the block. For example, motion vectors for sub-CUs can be derived based on top corner motion vectors found for each 4×4 block within the CU 102.

PMMVD can find an initial motion vector for the current CU 102 using bilateral matching or template matching. Bilateral matching can look at the current CU 102 and reference blocks in two different reference pictures along a motion trajectory, while template matching can look at corresponding blocks in the current CU 102 and a reference picture identified by a template. The initial motion vector found for the CU 102 can then be refined individually for each sub-CU.

BIO can be used when inter prediction is performed with bi-prediction based on earlier and later reference pictures, and allows motion vectors to be found for sub-CUs based on the gradient of the difference between the two reference pictures.

In some situations local illumination compensation (LIC) can be used at the CU level to find values for a scaling factor parameter and an offset parameter, based on samples neighboring the current CU 102 and corresponding samples neighboring a reference block identified by a candidate motion vector. In JVET, the LIC parameters can change and be signaled at the CU level.

For some of the above methods the motion vectors found for each of a CU's sub-CUs can be signaled to decoders at the CU level. For other methods, such as PMMVD and BIO, motion information is not signaled in the bitstream to save overhead, and decoders can derive the motion vectors through the same processes.

After the motion vectors for a CU 102 have been found, the encoder can generate a prediction CU 402 using those motion vectors. In some cases, when motion vectors have been found for individual sub-CUs, Overlapped Block Motion Compensation (OBMC) can be used when generating a prediction CU 402 by combining those motion vectors with motion vectors previously found for one or more neighboring sub-CUs.

When bi-prediction is used, JVET can use decoder-side motion vector refinement (DMVR) to find motion vectors. DMVR allows a motion vector to be found based on two motion vectors found for bi-prediction using a bilateral template matching process. In DMVR, a weighted combination of prediction CUs 402 generated with each of the two motion vectors can be found, and the two motion vectors can be refined by replacing them with new motion vectors that best point to the combined prediction CU 402. The two refined motion vectors can be used to generate the final prediction CU 402.

At 408, once a prediction CU 402 has been found with intra prediction at 404 or inter prediction at 406 as described above, the encoder can subtract the prediction CU 402 from the current CU 102 find a residual CU 410.

The encoder can use one or more transform operations at 412 to convert the residual CU 410 into transform coefficients 414 that express the residual CU 410 in a transform domain, such as using a discrete cosine block transform (DCT-transform) to convert data into the transform domain. JVET allows more types of transform operations than HEVC, including DCT-II, DST-VII, DST-VII, DCT-VIII, DST-I, and DCT-V operations. The allowed transform operations can be grouped into sub-sets, and an indication of which sub-sets and which specific operations in those sub-sets were used can be signaled by the encoder. In some cases, large block-size transforms can be used to zero out high frequency transform coefficients in CUs 102 larger than a certain size, such that only lower-frequency transform coefficients are maintained for those CUs 102.

In some cases a mode dependent non-separable secondary transform (MDNSST) can be applied to low frequency transform coefficients 414 after a forward core transform. The MDNSST operation can use a Hypercube-Givens Transform (HyGT) based on rotation data. When used, an index value identifying a particular MDNSST operation can be signaled by the encoder.

At 416, the encoder can quantize the transform coefficients 414 into quantized transform coefficients 416. The quantization of each coefficient may be computed by dividing a value of the coefficient by a quantization step, which is derived from a quantization parameter (QP). In some embodiments, the Qstep is defined as $2^{(QP-4)/6}$. Because high precision transform coefficients 414 can be converted into quantized transform coefficients 416 with a finite number of possible values, quantization can assist with data compression. Thus, quantization of the transform coefficients may limit an amount of bits generated and sent by the transformation process. However, while quantization is a lossy operation, and the loss by quantization cannot be recovered, the quantization process presents a trade-off between quality of the reconstructed sequence and an amount of information needed to represent the sequence. For example, a lower QP value can result in better quality decoded video, although a higher amount of data may be required for representation and transmission. In contrast, a high QP value can result in lower quality reconstructed video sequences but with lower data and bandwidth needs.

JVET can utilize variance-based adaptive quantization techniques, which allows every CU 102 to use a different quantization parameter for its coding process (instead of using the same frame QP in the coding of every CU 102 of the frame). The variance-based adaptive quantization techniques adaptively lowers the quantization parameter of certain blocks while increasing it in others. To select a specific QP for a CU 102, the CU's variance is computed. In brief, if a CU's variance is higher than the average variance of the frame, a higher QP than the frame's QP may be set for the CU 102. If the CU 102 presents a lower variance than the average variance of the frame, a lower QP may be assigned.

At 420, the encoder can find final compression bits 422 by entropy coding the quantized transform coefficients 418. Entropy coding aims to remove statistical redundancies of the information to be transmitted. In JVET, CABAC (Context Adaptive Binary Arithmetic Coding) can be used to code the quantized transform coefficients 418, which uses probability measures to remove the statistical redundancies. For CUs 102 with non-zero quantized transform coefficients 418, the quantized transform coefficients 418 can be converted into binary. Each bit ("bin") of the binary representation can then be encoded using a context model. A CU 102 can be broken up into three regions, each with its own set of context models to use for pixels within that region.

Multiple scan passes can be performed to encode the bins. During passes to encode the first three bins (bin0, bin1, and bin2), an index value that indicates which context model to use for the bin can be found by finding the sum of that bin position in up to five previously coded neighboring quantized transform coefficients 418 identified by a template.

A context model can be based on probabilities of a bin's value being '0' or '1'. As values are coded, the probabilities in the context model can be updated based on the actual number of '0' and '1' values encountered. While HEVC used fixed tables to re-initialize context models for each new picture, in JVET the probabilities of context models for new inter-predicted pictures can be initialized based on context models developed for previously coded inter-predicted pictures.

The encoder can produce a bitstream that contains entropy encoded bits 422 of residual CUs 410, prediction information such as selected intra prediction modes or motion vectors, indicators of how the CUs 102 were partitioned from a CTU 100 according to the QTBT structure, and/or other information about the encoded video. The bitstream can be decoded by a decoder as discussed below.

In addition to using the quantized transform coefficients 418 to find the final compression bits 422, the encoder can also use the quantized transform coefficients 418 to generate reconstructed CUs 434 by following the same decoding process that a decoder would use to generate reconstructed CUs 434. Thus, once the transformation coefficients have been computed and quantized by the encoder, the quantized transform coefficients 418 may be transmitted to the decoding loop in the encoder. After quantization of a CU's transform coefficients, a decoding loop allows the encoder to generate a reconstructed CU 434 identical to the one the decoder generates in the decoding process. Accordingly, the encoder can use the same reconstructed CUs 434 that a decoder would use for neighboring CUs 102 or reference pictures when performing intra prediction or inter prediction for a new CU 102. Reconstructed CUs 102, reconstructed slices, or full reconstructed frames may serve as references for further prediction stages.

At the encoder's decoding loop (and see below, for the same operations in the decoder) to obtain pixel values for the reconstructed image, a dequantization process may be performed. To dequantize a frame, for example, a quantized value for each pixel of a frame is multiplied by the quantization step, e.g., (Qstep) described above, to obtain reconstructed dequantized transform coefficients 426. For example, in the decoding process shown in FIG. 4 in the encoder, the quantized transform coefficients 418 of a residual CU 410 can be dequantized at 424 to find dequantized transform coefficients 426. If an MDNSST operation was performed during encoding, that operation can be reversed after dequantization.

At 428, the dequantized transform coefficients 426 can be inverse transformed to find a reconstructed residual CU 430, such as by applying a DCT to the values to obtain the reconstructed image. At 432 the reconstructed residual CU 430 can be added to a corresponding prediction CU 402 found with intra prediction at 404 or inter prediction at 406, in order to find a reconstructed CU 434.

At 436, one or more filters can be applied to the reconstructed data during the decoding process (in the encoder or, as described below, in the decoder), at either a picture level or CU level. For example, the encoder can apply a deblocking filter, a sample adaptive offset (SAO) filter, and/or an adaptive loop filter (ALF). The encoder's decoding process may implement filters to estimate and transmit to a decoder the optimal filter parameters that can address potential artifacts in the reconstructed image. Such improvements increase the objective and subjective quality of the reconstructed video. In deblocking filtering, pixels near a sub-CU boundary may be modified, whereas in SAO, pixels in a CTU 100 may be modified using either an edge offset or band offset classification. JVET's ALF can use filters with circularly symmetric shapes for each 2×2 block. An indication of the size and identity of the filter used for each 2×2 block can be signaled.

If reconstructed pictures are reference pictures, they can be stored in a reference buffer 438 for inter prediction of future CUs 102 at 406.

During the above steps, JVET allows a content adaptive clipping operations to be used to adjust color values to fit between lower and upper clipping bounds. The clipping bounds can change for each slice, and parameters identifying the bounds can be signaled in the bitstream.

Figure 6:
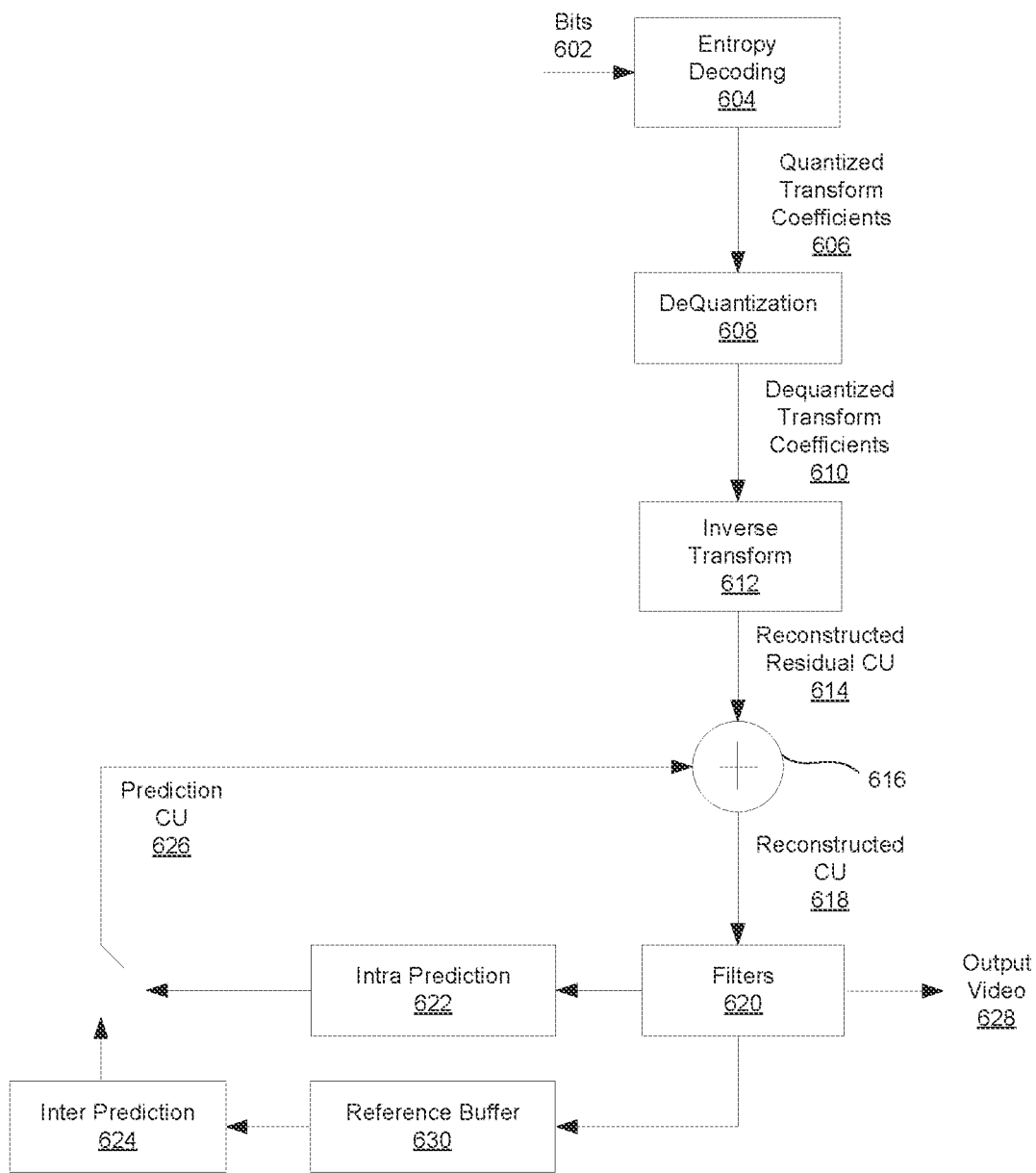
FIG. 6 depicts a simplified block diagram for CU coding in a JVET of VVC decoder.

FIG. 6 depicts a simplified block diagram for CU coding in a JVET decoder. A JVET decoder can receive a bitstream containing information about encoded CUs 102. The bitstream can indicate how CUs 102 of a picture were partitioned from a CTU 100 according to a QTBT structure, prediction information for the CUs 102 such as intra prediction modes or motion vectors, and bits 602 representing entropy encoded residual CUs.

At 604 the decoder can decode the entropy encoded bits 602 using the CABAC context models signaled in the bitstream by the encoder. The decoder can use parameters signaled by the encoder to update the context models' probabilities in the same way they were updated during encoding.

After reversing the entropy encoding at 604 to find quantized transform coefficients 606, the decoder can dequantize them at 608 to find dequantized transform coefficients 610. If an MDNSST operation was performed during encoding, that operation can be reversed by the decoder after dequantization.

At 612, the dequantized transform coefficients 610 can be inverse transformed to find a reconstructed residual CU 614. At 616, the reconstructed residual CU 614 can be added to a corresponding prediction CU 626 found with intra prediction at 622 or inter prediction at 624, in order to find a reconstructed CU 618.

At 620, one or more filters can be applied to the reconstructed data, at either a picture level or CU level. For example, the decoder can apply a deblocking filter, a sample adaptive offset (SAO) filter, and/or an adaptive loop filter (ALF). As described above, the in-loop filters located in the decoding loop of the encoder may be used to estimate optimal filter parameters to increase the objective and subjective quality of a frame. These parameters are transmitted to the decoder to filter the reconstructed frame at 620 to match the filtered reconstructed frame in the encoder.

After reconstructed pictures have been generated by finding reconstructed CUs 618 and applying signaled filters, the decoder can output the reconstructed pictures as output video 628. If reconstructed pictures are to be used as reference pictures, they can be stored in a reference buffer 630 for inter prediction of future CUs 102 at 624.

Bi-directional temporal prediction employs two MVs referring to reference slices in two reference lists to determine two prediction blocks. These two prediction blocks are then combined to form final prediction block. In JVET and VVC, several inter coding modes (skip, merge, FRUC, AMVP, AFFINE) include bi-directional temporal prediction to increased prediction accuracy. Signaling for the two MVs varies by the coding mode. AMVP (Advanced MV Predictor) utilizes the most flexible signaling for the two MVs. Specifically, three information types are required to generate MV; reference index, MVP index, and MVD. Hence, a coding block using AMVP with bi-directional temporal prediction must send two reference indices, two MVP indices, and two MVDs.

The affine motion model describes motion between two frames in a more flexible way, such as rotation, shear and scale. The affine model employs an affine transformation to describe motion based on model parameters. In JVET and VVC, four or six parameter models can be employed. Instead of using affine motion model to compute motion field for each pixel in coding block, JVET and VVC can compute MV at a coarser granularity, such as a block of size 4×4. Moreover, JVET and VVC describe an affine motion model of a coding block through control point motion vectors. That is, MV for each block coding using affine mode can be determined based on control point motion vectors.

Control point MVs can be coded using predictive coding in a similar fashion as normal MV in JVET and VVC. MV predictors for each control point MV are first determined and then MV a difference between the MV predictor and the control point MV can then be coded and signaled in the bitstream. That is, two control point MVs can be used for a four-parameter Affine model and three control point MVs can be used for a six-parameter Affine model.

Bi-directional temporal prediction using Affine motion model requires additional overhead to signal additional control point MV. For four-parameter Affine model, two MVDs are signaled for each list, instead of one. Similarly, three MVDs are signaled for each list, instead of one, when six-parameter Affine model is used. Hence, two points (four-parameter) affine can have up to four sets of motion information if both points are bi-prediction. That is, one set of motion information includes one reference index, one MVP index and one MVD.

Disclosed is a system and method of reducing overhead of Bi-directional temporal prediction. The current approach in JVET and VVC signals MV information overhead twice resulting in two MVs that are independent from each other. The overhead or signaling two independent MVs can be reduced if the two MVs for bi-directional temporal prediction are related. When the two MVs are related (or paired), the second MV can be fully or partially derived from the first MV and thus reducing the overhead for the second MV.

The relationship between the MV pair (first MV and second MV) can be significant for achieving high coding efficiency. There are many possible ways to define a MV pair relationship. In some embodiments, optical flow can be assumed and/or that the first MV and second MV can have similar trajectories can be assumed. In such an embodiment, the second MV can be considered a scaled version of the first MV and the relationship can be defined as follows:

$$MV2 = ((POC\_Cur - POC\_L1)/(POC\_Cur - POC\_L0)) * MV1$$

Wherein:
MV1 and MV2 are MV of the first and second MV, respectively;
POC_Cur is the POC index of the current slice; and
POC_L0 and POC_L1 are the POC indices of the reference used by MV1 and MV2, respectively.

This equation shows an example of a derivation of the second MV in which the first MV of the MV pair uses a reference slice stored in one of reference lists, such as reference list 0 (and or any other known, convenient and/or desired reference) and the second MV of the MV pair uses a reference slice stored in another list of reference lists (and or any other known, convenient and/or desired reference).

Additionally, there are many ways to signal the second MV with reduced overhead based on the system in which the second MV is derived from the first MV. In some embodiments, the signaling scheme may not send a reference index, MVP index and MVD of the second MV. In such embodiments, a reference slice in list 1 can be determined to be used for the second MV—by way of non-limiting example, reference index 0 of list 1 can be used. MV2 can thus be computed based on the equation provided.

In some alternate embodiments, MV2 can be configured as the mirror of MV1 and thus be derived or constructed from MV1.

In still further alternate embodiments, a reference index, absent sending an MVP index and MVD of the second MV can be established from the MV1 and MV2 information. In such alternate embodiments, the system can first determine a reference slice in list 1 of the second MV using the signaled reference index which can be literally signaled, then compute MV2 according to the provided equation.

There are a few possible ways to utilize MV pair concept when the affine motion model is employed. In some embodiments, a control point MV of the second list can be determined by scaling a corresponding control point MV of the first list in accordance with the equation provided above. A MV of the second list for each sub-block within a coding block can then be computed based on the derived control point MV. In some alternate embodiments, a MV of the first list for each sub-block can be determined using signaled control point MVs, then a scaled MV of the first list can be used to determine the MV of the second list for each sub-block.

In still further alternate embodiments, MVD2 can be related to MVD1 where MVD1 and MVD2 are difference between motion vectors interrelated in accordance with the following equation:

$$MVD2 = ((POC\_Cur - POC\_L1)/(POC\_Cur - POC\_L0)) * MVD1$$

Thus, MVD2 can be derived or determined from MVD1 and the system can send reference index information and an MVP index, but the MVD of the second MV need not be transmitted as it can be directly determined from MVD1.

Furthermore, there are also many ways to add an MV pair (interrelated MV1 and MV2) concept to the existing AMVP and affine bi-directional temporal prediction systems. In some embodiments, a new flag at CU level can be introduced to indicate whether an MV pair with reduced MV2 overhead or the existing full MV2 overhead signaling is used. In embodiments in which full MV2 overhead signaling is used, reference index, MVP index and MVD can be signaled as in current JVET and VVC systems. In alternate embodiments, an MV pair option can be signaled as a special index of list 1—by way of non-limiting example, reference index 1 can be considered MV pair option with a reference slice set to index 0 of list 1. Additionally, in some embodiments, this option can be disabled for Generalized P/B (GPB) slice, where all reference slices in list 0 are identical to list 1, since MV1 and MV2 are identical based on the provided equation.

Figure 7:
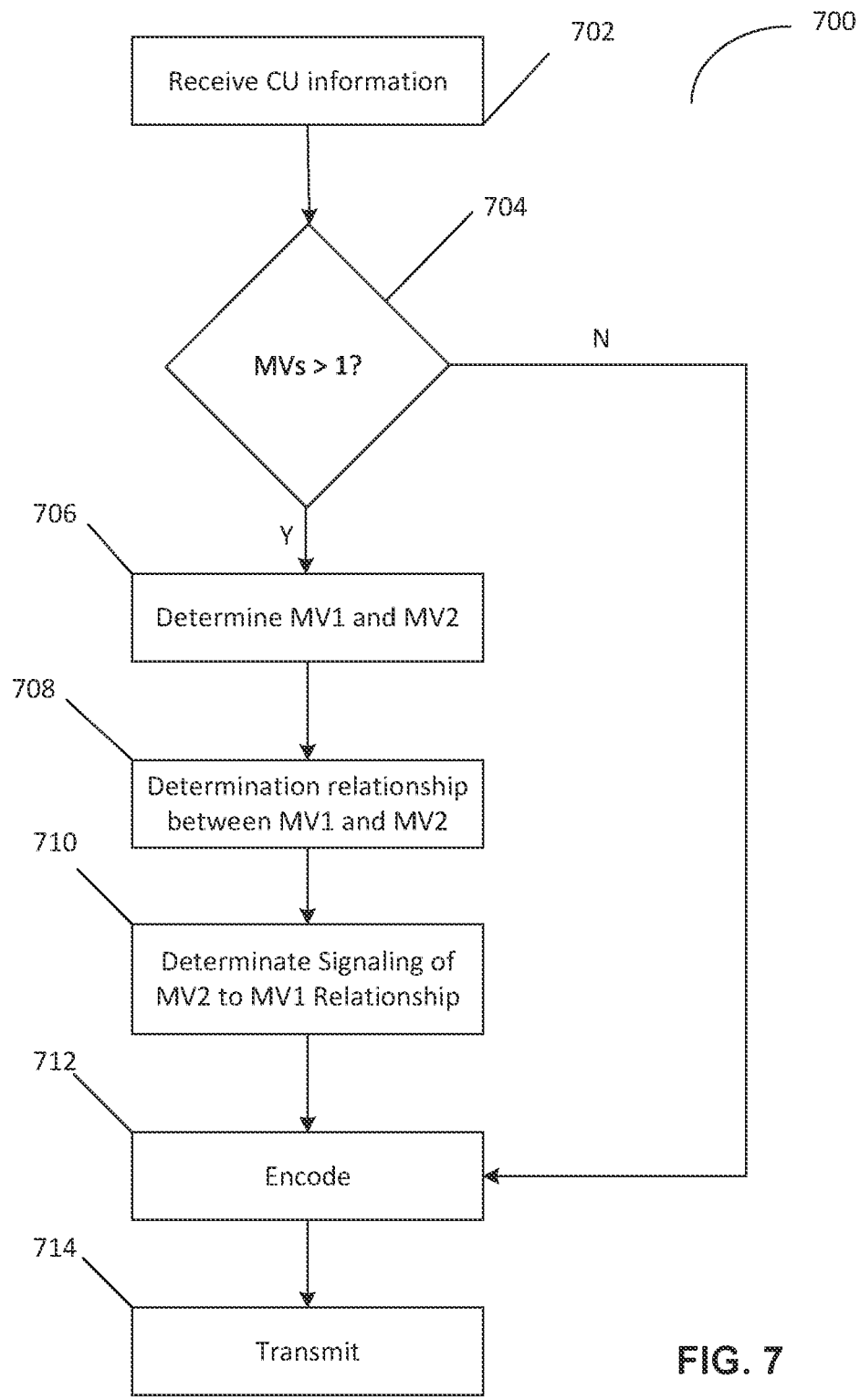
FIG. 7 depicts a block diagram of a reduced-overhead encoding method for use in encoding video.

FIG. 7 depicts a block diagram of a reduced-overhead encoding method 700 for use in encoding video. In step 702 information related to a CU can be received then in step 704 the information can be evaluated to determine whether more than one MV is to be used in the coding process. If in step 704 it is determined that more than one MV is to be used in the coding process, then the system can proceed to step 706 in which MV1 (the first motion vector) and MV2 (the second motion vector) are determined. Then in step 708, a relationship between MV1 and MV2 can be determined, using any one or more of the previously described techniques and/or any other known convenient and/or desired method and/or technique. However, in some embodiments, step 708 can precede step 706 and the second motion vector can be defined directly by reference to the first motion vector. In step 710, signaling related to the relationship between MV1 and MV2 can be determined, using any one or more of the previously described techniques and/or any other known convenient and/or desired method and/or technique and then the CU can be encoded with the relevant information related to MV1 and the relationship to MV2 in step 712 and the encoded bitstream can be transmitted in step 714. If in step 704 it is determined that fewer than two MVs are desired for encoding, then the process can proceed directly from step 704 to the encoding step 712 and then to transmission in step 714.

Figure 8:
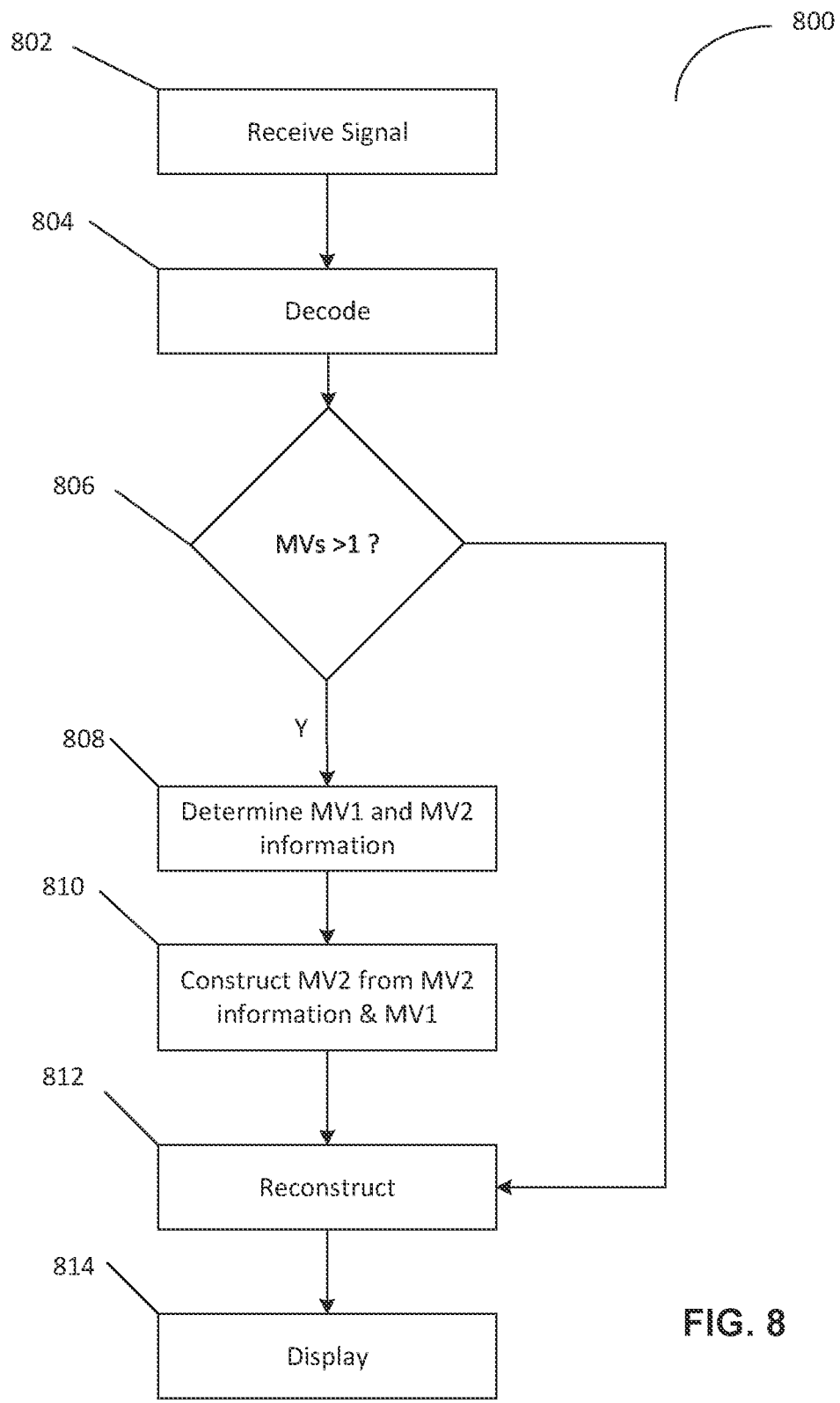
FIG. 8 depicts a block diagram of a reduced-overhead decoding method for use in decoding video.

FIG. 8 depicts a block diagram of a reduced-overhead decoding method 800 for use in decoding video. In step 802 a signal is received and then a CU is decoded in step 804. The in step 806 is determined whether more than one MV is indicated in the received signal. If in step 806 it is determined that more than one MV is indicated in the received signal, then in step 808 MV1 is determined from signal and information regarding MV2 is determined from the signal. MV2 is then constructed from MV1 and the information regarding MV2 in step 810. The reconstruction of MV2 can be performed in accordance with any of the techniques and methods described herein and/or any other know, convenient and/or desired technique and/or method. In step 812 the video can be reconstructed and then can be displayed in step 814. If in step 806 is determined that one or fewer MVs are indicated in the received signal, then the system can proceed from step 806 to reconstruction of the video in step 812 and display in step 814.

Multiple-hypothesis temporal prediction employs more than two MVs referring to reference slices from one or more reference list(s) to determine multiple prediction blocks. These prediction blocks can then be combined to form final prediction block by a weighted combination of these prediction blocks. In order to identify the motion information for each hypothesis, several inter coding modes (skip, merge, FRUC, AMVP, AFFINE) can be used. AMVP (Advanced MV Predictor) utilizes the most flexible signaling for signaling MV. Specifically, four information types are typically required to generate a MV, namely, reference index, MVP index, MVD, and hypothesis weight. Hence, a coding block using AMVP with multiple-hypothesis temporal prediction sends multiple reference indices, multiple MVP indices, multiple MVDs, and multiple hypothesis weights, depending on how many hypotheses are employed.

Disclosed herein are a system and method for reducing overhead for multiple-hypothesis temporal prediction. It is a reasonable assumption that a moving object follows the same trajectory and has the same optical flow regardless of the hypothesis adopted. As a result, the motion vector for each hypothesis should have a similar trajectory. Thus, based upon motion information for one prediction, the motion information for other hypotheses can be considered scaled versions of that one hypothesis. It therefore follows that motion vectors for other hypotheses can be derived based upon the existing motion information of the one (in some cases first) hypothesis.

By way of non-limiting example, assume there are N hypotheses, where N is larger than 2. For each hypothesis n, where n is index of multiple hypotheses and ranges from 0 to N−1, the corresponding motion vector (MV), reference index, motion vector predictor (MVP) and motion vector difference (MVD) between the motion vector of the current block and its predictor are mv_n, ref_n, mvp_n and mvd_n respectively. If POC_Cur is the POC index of the current slice and POC_hypo(0), POC_hypo(1), . . . , POC_hypo(n−1) are POC indices of the first hypothesis, the second hypothesis, . . . and the (n−1)th hypotheses, then mv_n for all hypotheses can be derived from the motion vector of the first hypotheses (mv_0) as follows:

$$mv\_n = ((POC\_Cur - POC\_hypo(n))/(POC\_Cur - POC\_hypo(0))) * mv\_0$$

Thus, if alternate prediction model MVs are derived by using the above equation then mvp_n and mvd_n need not be coded for the alternate prediction models as they can be derived.

Additionally, mvd_n can be defined as follows:

$$mvd\_n = ((POC\_Cur - POC\_hypo(n))/(POC\_Cur - POC\_hypo(0))) * mvd\_0$$

Again, if alternate prediction model mvd_n's are derived by using the above equation then mvp_n and mvd_n need not be coded for the alternate prediction models as they can be derived.

However, in alternate embodiments, the first N1 hypotheses where 1<N1<N−1 can be coded regularly with coding reference index, motion vector predictor index and motion vector difference, and then the motion information of remaining N−N1+1 hypotheses can be derived based on one or several regularly coded hypotheses according to appropriately modified versions the above provided equations.

The use of derivation of MV of multiple-hypothesis can be signaled in many ways. In some embodiments, a flag at CU level can be used to indicate whether this new derivation MV is used. When the signal is coded in the normal manner with all references, reference index, MVP index, MVD, and hypothesis weight for each hypothesis can be signaled. However, when the MV derivation system and method are used, several reference indexes, MVP indexes and MVD or MVD for some hypotheses need not be coded. In some embodiments, this option can be disabled for a GPB slice, where all reference slices in list 0 are identical to list 1, since MV1 and MV2 would be identical, based upon the above equations.

Figure 9:
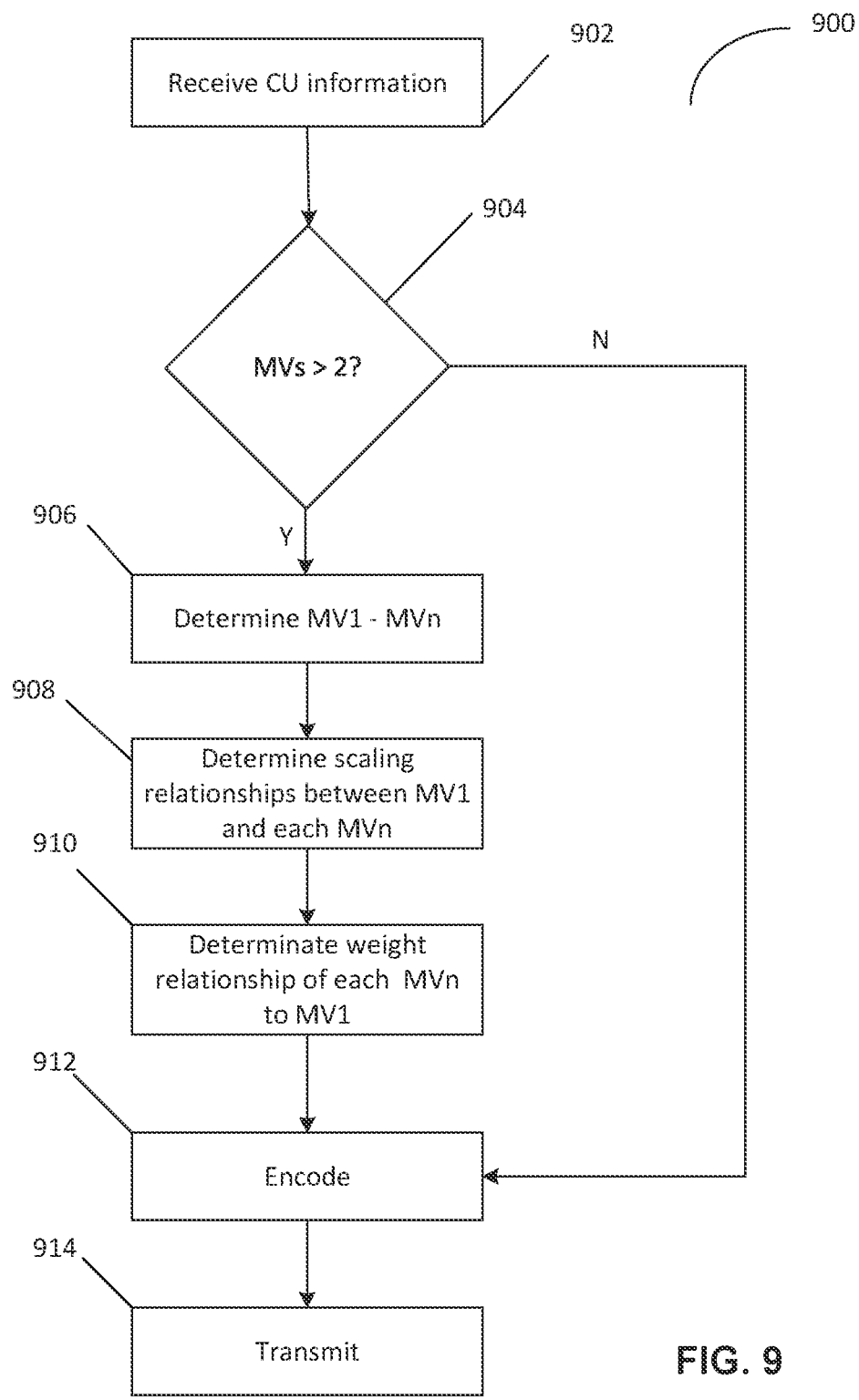
FIG. 9 depicts a block diagram of a reduced-overhead encoding method for use in encoding video.

FIG. 9 depicts a block diagram of a reduced-overhead encoding method 900 for use in encoding video utilizing multiple hypotheses. In step 902 information related to a CU can be received then in step 904 the information can be evaluated to determine whether more than two MVs are to be used in the coding process. If in step 904 it is determined that more than two MVs are to be used in the coding process, then the system can proceed to step 906 in which MV1 (the first motion vector) and each alternate hypothesis MVn are determined. Then in step 908, a scaling relationship between MV1 and each MVn can be determined, using any one or more of the previously described techniques and/or any other known convenient and/or desired method and/or technique. However, in some embodiments, step 908 can precede step 906 and the MVn vectors can be defined directly by scaled reference to the first motion vector, MV1. In step 910, the weight of each MV1 to MVn value can be determined, using any one or more of the previously described techniques and/or any other known convenient and/or desired method and/or technique and then the CU can be encoded with the relevant information related to MV1 and the scaling and weight relationship to each MVn in step 912 and the encoded bitstream can be transmitted in step 914. If in step 904 it is determined that fewer than two MVs are desired for encoding, then the process can proceed as described in FIG. 7. Additionally, a similar process as described in reference to FIG. 9 can be applied to MVD records.

Figure 10:
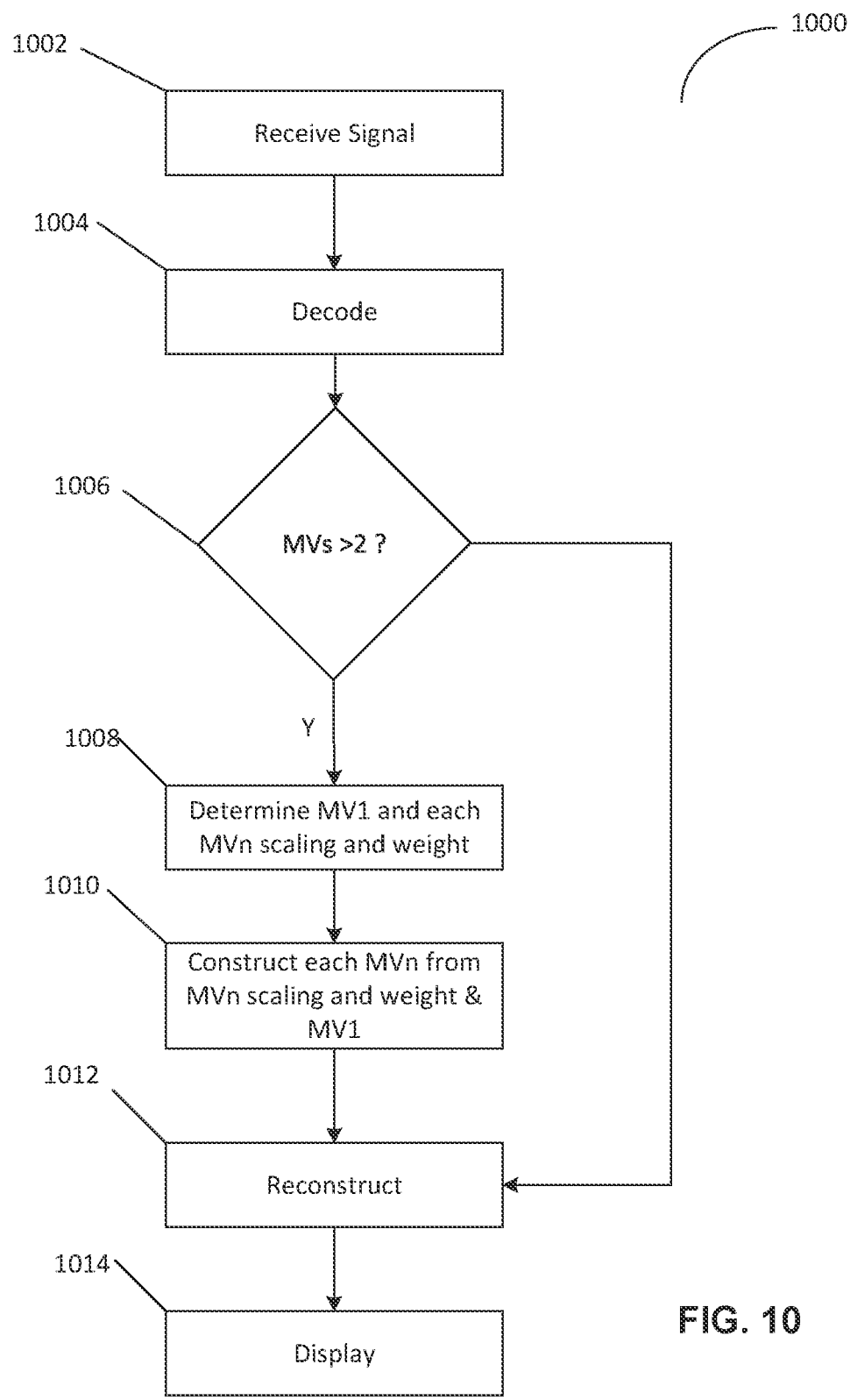
FIG. 10 depicts a block diagram of a reduced-overhead decoding method for use in decoding video.

FIG. 10 depicts a block diagram of a reduced-overhead decoding method 1000 for use in decoding video. In step 1002 a signal is received and then a CU is decoded in step 1004. The in step 1006 is determined whether more than two MVs are indicated in the received signal. If in step 1006 it is determined that more than two MVs are indicated in the received signal, then in step 1008 MV1 is determined from signal and weight and scaling information for each MVn is determined from the signal. Each MVn is then constructed from MV1 and the weight and scaling information for each MVn in step 1010. The reconstruction of each MVn can be performed in accordance with any of the techniques and methods described herein and/or any other know, convenient and/or desired technique and/or method. In step 1012 the video can be reconstructed and then can be displayed in step 1014. If in step 1006 is determined that fewer than two MVs are indicated in the received signal, then the system can proceed in accordance with the process described in FIG. 8. Additionally, a similar process as described in reference to FIG. 10 can be applied to MVD records.

Figure 11:
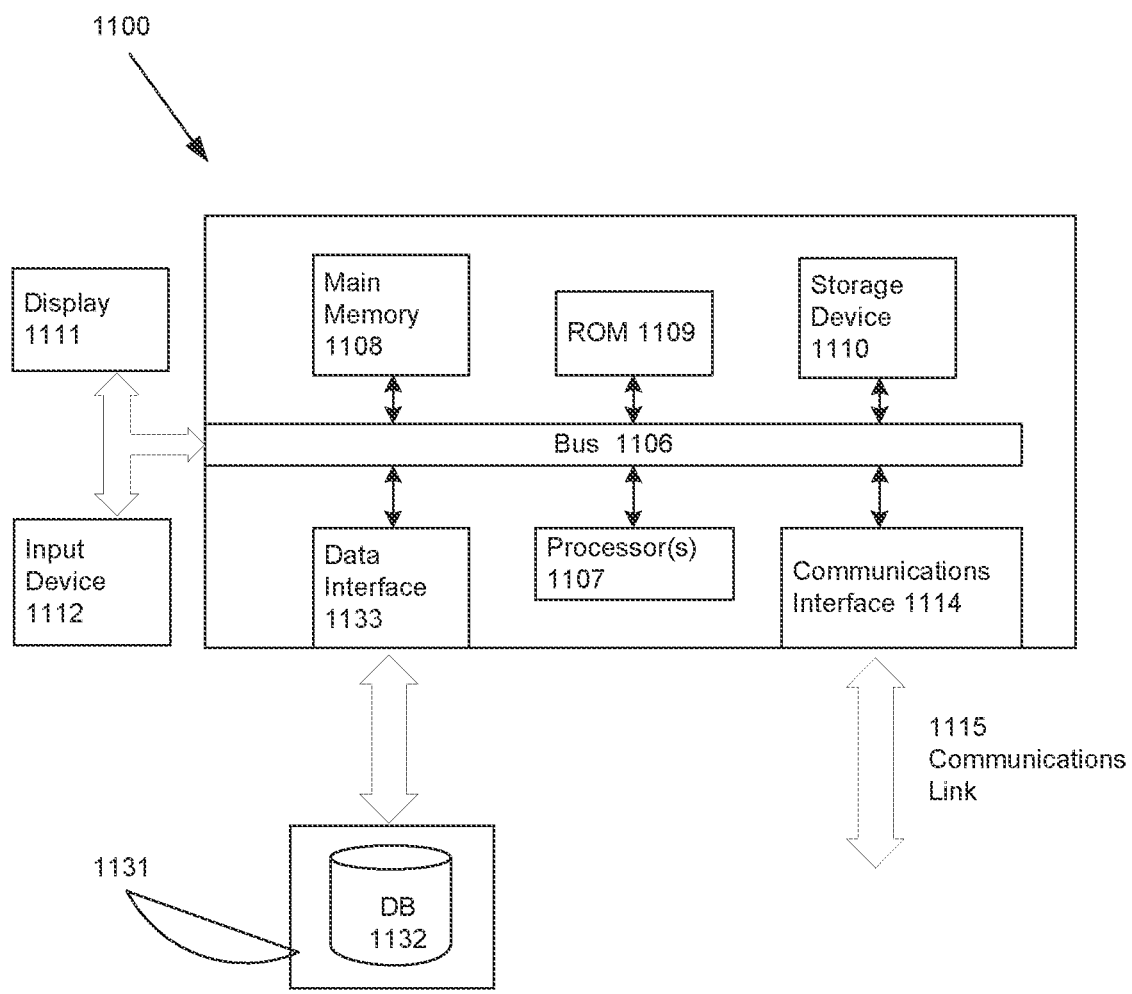
FIG. 11 depicts an embodiment of a computer system adapted and configured to provide for variable template size for template matching.

The execution of the sequences of instructions required to practice the embodiments can be performed by a computer system 1100 as shown in FIG. 11. In an embodiment, execution of the sequences of instructions is performed by a single computer system 1100. According to other embodiments, two or more computer systems 1100 coupled by a communication link 1115 can perform the sequence of instructions in coordination with one another. Although a description of only one computer system 1100 will be presented below, however, it should be understood that any number of computer systems 1100 can be employed to practice the embodiments.

A computer system 1100 according to an embodiment will now be described with reference to FIG. 11, which is a block diagram of the functional components of a computer system 1100. As used herein, the term computer system 1100 is broadly used to describe any computing device that can store and independently run one or more programs.

Each computer system 1100 can include a communication interface 1114 coupled to the bus 1106. The communication interface 1114 provides two-way communication between computer systems 1100. The communication interface 1114 of a respective computer system 1100 transmits and receives electrical, electromagnetic or optical signals, that include data streams representing various types of signal information, e.g., instructions, messages and data. A communication link 1115 links one computer system 1100 with another computer system 1100. For example, the communication link 1115 can be a LAN, in which case the communication interface 1114 can be a LAN card, or the communication link 1115 can be a PSTN, in which case the communication interface 1114 can be an integrated services digital network (ISDN) card or a modem, or the communication link 1115 can be the Internet, in which case the communication interface 1114 can be a dial-up, cable or wireless modem.

A computer system 1100 can transmit and receive messages, data, and instructions, including program, i.e., application, code, through its respective communication link 1115 and communication interface 1114. Received program code can be executed by the respective processor(s) 1107 as it is received, and/or stored in the storage device 1110, or other associated non-volatile media, for later execution.

In an embodiment, the computer system 1100 operates in conjunction with a data storage system 1131, e.g., a data storage system 1131 that contains a database 1132 that is readily accessible by the computer system 1100. The computer system 1100 communicates with the data storage system 1131 through a data interface 1133. A data interface 1133, which is coupled to the bus 1106, transmits and receives electrical, electromagnetic or optical signals, that include data streams representing various types of signal information, e.g., instructions, messages and data. In embodiments, the functions of the data interface 1133 can be performed by the communication interface 1114.

Computer system 1100 includes a bus 1106 or other communication mechanism for communicating instructions, messages and data, collectively, information, and one or more processors 1107 coupled with the bus 1106 for processing information. Computer system 1100 also includes a main memory 1108, such as a random access memory (RAM) or other dynamic storage device, coupled to the bus 1106 for storing dynamic data and instructions to be executed by the processor(s) 1107. The main memory 1108 also can be used for storing temporary data, i.e., variables, or other intermediate information during execution of instructions by the processor(s) 1107.

The computer system 1100 can further include a read only memory (ROM) 1109 or other static storage device coupled to the bus 1106 for storing static data and instructions for the processor(s) 1107. A storage device 1110, such as a magnetic disk or optical disk, can also be provided and coupled to the bus 1106 for storing data and instructions for the processor(s) 1107.

A computer system 1100 can be coupled via the bus 1106 to a display device 1111, such as, but not limited to, a cathode ray tube (CRT) or a liquid-crystal display (LCD) monitor, for displaying information to a user. An input device 1112, e.g., alphanumeric and other keys, is coupled to the bus 1106 for communicating information and command selections to the processor(s) 1107.

According to one embodiment, an individual computer system 1100 performs specific operations by their respective processor(s) 1107 executing one or more sequences of one or more instructions contained in the main memory 1108. Such instructions can be read into the main memory 1108 from another computer-usable medium, such as the ROM 1109 or the storage device 1110. Execution of the sequences of instructions contained in the main memory 1108 causes the processor(s) 1107 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1107. Such a medium can take many forms, including, but not limited to, non-volatile, volatile and transmission media. Non-volatile media, i.e., media that can retain information in the absence of power, includes the ROM 1109, CD ROM, magnetic tape, and magnetic discs. Volatile media, i.e., media that can not retain information in the absence of power, includes the main memory 1108. Transmission media includes coaxial cables, copper wire and fiber optics, including the wires that comprise the bus 1106. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Figure 12:
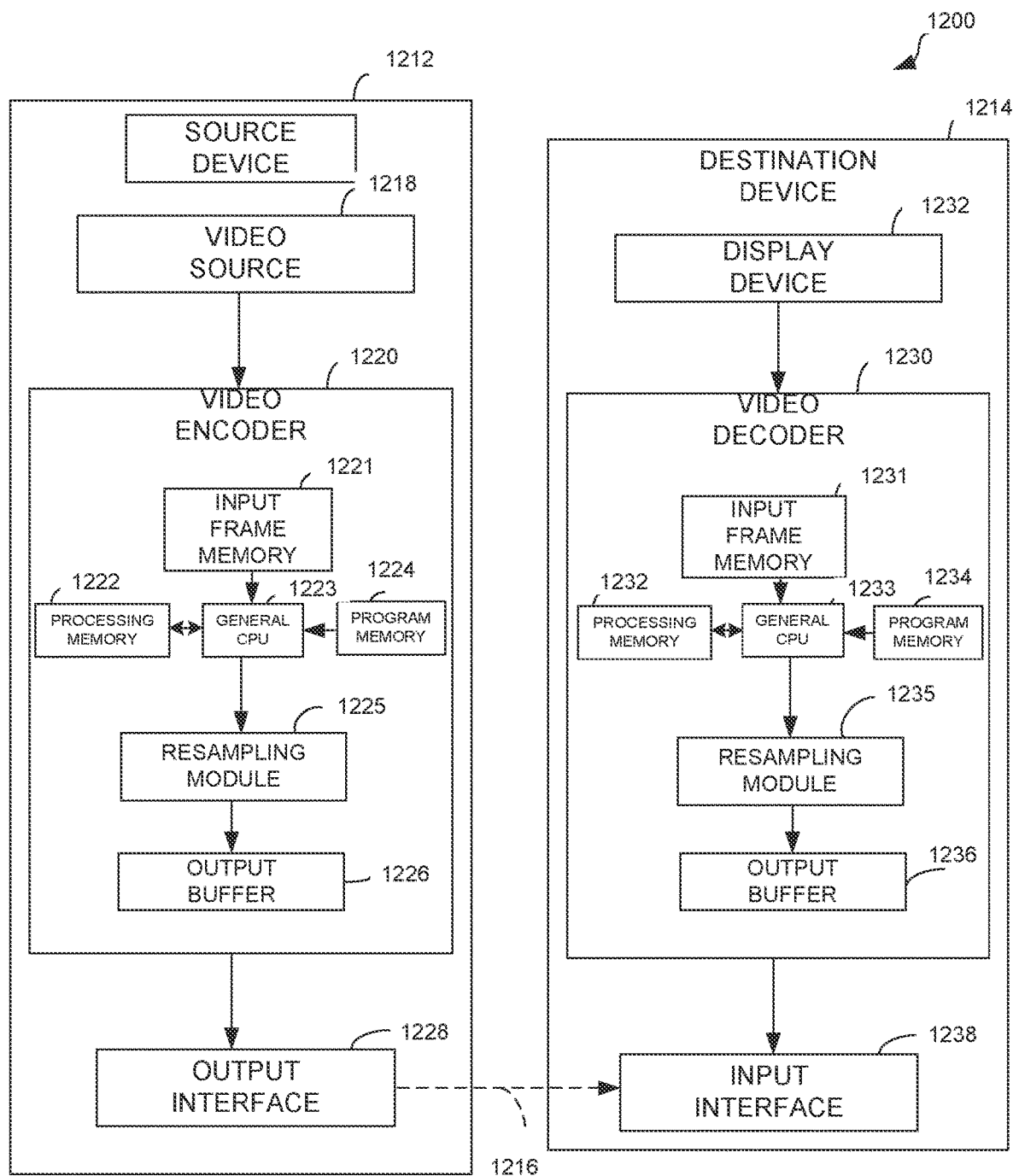
FIG. 12 depicts an embodiment of video encoder/decoder adapted and configured to provide for variable template size for template matching.

FIG. 12 is a high level view of a source device 1212 and destination device 1214 that may incorporate features of the systems and devices described herein. As shown in FIG. 12, example video coding system 1200 includes a source device 1212 and a destination device 1214 where, in this example, the source device 1212 generates encoded video data. Accordingly, source device 1212 may be referred to as a video encoding device. Destination device 1214 may decode the encoded video data generated by source device 1212. Accordingly, destination device 1214 may be referred to as a video decoding device. Source device 1212 and destination device 1214 may be examples of video coding devices.

Destination device 1214 may receive encoded video data from source device 1212 via a channel 1216. Channel 1216 may comprise a type of medium or device capable of moving the encoded video data from source device 1212 to destination device 1214. In one example, channel 1216 may comprise a communication medium that enables source device 1212 to transmit encoded video data directly to destination device 1214 in real-time.

In this example, source device 1212 may modulate the encoded video data according to a communication standard, such as a wireless communication protocol, and may transmit the modulated video data to destination device 1214. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 1212 to destination device 1214. In another example, channel 1216 may correspond to a storage medium that stores the encoded video data generated by source device 1212.

In the example of FIG. 12, source device 1212 includes a video source 1218, video encoder 1220, and an output interface 1222. In some cases, output interface 1228 may include a modulator/demodulator (modem) and/or a transmitter. In source device 1212, video source 1218 may include a source such as a video capture device, e.g., a video camera, a video archive containing previously captured video data, a video feed interface to receive video data from a video content provider, and/or a computer graphics system for generating video data, or a combination of such sources.

Video encoder 1220 may encode the captured, pre-captured, or computer-generated video data. An input image may be received by the video encoder 1220 and stored in the input frame memory 1221. The general purpose processor 1223 may load information from here and perform encoding. The program for driving the general purpose processor may be loaded from a storage device, such as the example memory modules depicted in FIG. 12. The general purpose processor may use processing memory 1222 to perform the encoding, and the output of the encoding information by the general processor may be stored in a buffer, such as output buffer 1226.

The video encoder 1220 may include a resampling module 1225 which may be configured to code (e.g., encode) video data in a scalable video coding scheme that defines at least one base layer and at least one enhancement layer. Resampling module 1225 may resample at least some video data as part of an encoding process, wherein resampling may be performed in an adaptive manner using resampling filters.

The encoded video data, e.g., a coded bit stream, may be transmitted directly to destination device 1214 via output interface 1228 of source device 1212. In the example of FIG. 12, destination device 1214 includes an input interface 1238, a video decoder 1230, and a display device 1232. In some cases, input interface 1228 may include a receiver and/or a modem. Input interface 1238 of destination device 1214 receives encoded video data over channel 1216. The encoded video data may include a variety of syntax elements generated by video encoder 1220 that represent the video data. Such syntax elements may be included with the encoded video data transmitted on a communication medium, stored on a storage medium, or stored a file server.

The encoded video data may also be stored onto a storage medium or a file server for later access by destination device 1214 for decoding and/or playback. For example, the coded bitstream may be temporarily stored in the input buffer 1231, then loaded in to the general purpose processor 1233. The program for driving the general purpose processor may be loaded from a storage device or memory. The general purpose processor may use a process memory 1232 to perform the decoding. The video decoder 1230 may also include a resampling module 1235 similar to the resampling module 1225 employed in the video encoder 1220.

FIG. 12 depicts the resampling module 1235 separately from the general purpose processor 1233, but it would be appreciated by one of skill in the art that the resampling function may be performed by a program executed by the general purpose processor, and the processing in the video encoder may be accomplished using one or more processors. The decoded image(s) may be stored in the output frame buffer 1236 and then sent out to the input interface 1238.

Display device 1238 may be integrated with or may be external to destination device 1214. In some examples, destination device 1214 may include an integrated display device and may also be configured to interface with an external display device. In other examples, destination device 1214 may be a display device. In general, display device 1238 displays the decoded video data to a user.

Video encoder 1220 and video decoder 1230 may operate according to a video compression standard. ITU-T VCEG (Q6/16) and ISO/IEC MPEG (JTC 1/SC 29/WG 11) are studying the potential need for standardization of future video coding technology with a compression capability that significantly exceeds that of the current High Efficiency Video Coding HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. A recent capture of JVET development is described in the "Algorithm Description of Joint Exploration Test Model 5 (JEM 5)", JVET-E1201-V2, authored by J. Chen, E. Alshina, G. Sullivan, J. Ohm, J. Boyce.

Additionally or alternatively, video encoder 1220 and video decoder 1230 may operate according to other proprietary or industry standards that function with the disclosed JVET features. Thus, other standards such as the ITU-T H.264 standard, alternatively referred to as MPEG-4, Part 12, Advanced Video Coding (AVC), or extensions of such standards. Thus, while newly developed for JVET, techniques of this disclosure are not limited to any particular coding standard or technique. Other examples of video compression standards and techniques include MPEG-2, ITU-T H.263 and proprietary or open source compression formats and related formats.

Video encoder 1220 and video decoder 1230 may be implemented in hardware, software, firmware or any combination thereof. For example, the video encoder 1220 and decoder 1230 may employ one or more processors, digital signal processors (DSPs), application specific integrated circuits (ASICs), field programmable gate arrays (FPGAs), discrete logic, or any combinations thereof. When the video encoder 1220 and decoder 1230 are implemented partially in software, a device may store instructions for the software in a suitable, non-transitory computer-readable storage medium and may execute the instructions in hardware using one or more processors to perform the techniques of this disclosure. Each of video encoder 1220 and video decoder 1230 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer, such as the general-purpose processors 1223 and 1233 described above. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Examples of memory include random access memory (RAM), read only memory (ROM), or both. Memory may store instructions, such as source code or binary code, for performing the techniques described above. Memory may also be used for storing variables or other intermediate information during execution of instructions to be executed by a processor, such as processor 1223 and 1233.

A storage device may also store instructions, instructions, such as source code or binary code, for performing the techniques described above. A storage device may additionally store data used and manipulated by the computer processor. For example, a storage device in a video encoder 1220 or a video decoder 1230 may be a database that is accessed by computer system 1223 or 1233. Other examples of storage device include random access memory (RAM), read only memory (ROM), a hard drive, a magnetic disk, an optical disk, a CD-ROM, a DVD, a flash memory, a USB memory card, or any other medium from which a computer can read.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed is:

1. A method of decoding a video included in a bitstream by a decoder, comprising:
   (a) receiving said bitstream indicating how a coding tree unit was partitioned into coding units according to a quad tree plus multi tree structure that allows a square parent node to be split with a quaternary tree partitioning that splits said square parent node in half in both horizontal and vertical directions to define leaf nodes that are square in shape each of which are the same size, wherein said quad tree plus multi tree structure allows each of said leaf nodes to be split based upon one selected from a group consisting of,
      (i) a symmetric binary tree partitioning that splits one of said leaf nodes of said quaternary tree partitioning in half in either a horizontal direction or a vertical direction resulting in two blocks that are the same size as leaf nodes, and
      (ii) an asymmetric tree partitioning that splits one of said leaf nodes of said quaternary tree partitioning in either a horizontal direction or a vertical direction resulting in three blocks two of which are different in size than a third one of said three blocks as leaf nodes;

(b) identifying final coding units to be decoded represented by leaf nodes of the quad tree plus multi tree structure;

(c) wherein a plurality of said final coding units are rectangular coding units included in a bi-predictive B-slice of a current frame of said video;

(d) receiving a first motion vector associated with said coding unit of said bi-predictive B-slice of said current frame of said video referencing a temporally previous reference slice of a temporally previous reference frame relative to said current frame of said coding unit;

(e) receiving a second motion vector associated with said coding unit of said bi-predictive B-slice of said current frame of said video referencing a temporally future reference slice of a temporally future reference frame relative to said current frame of said coding unit;

(f) applying an optical flow between said temporally future reference slice and said temporally previous reference slice to perform a sample based motion modification using a corrective motion vector applied to predicted arrays based upon at least one of said second motion vector and said first motion vector; and;

(g) decoding said coding unit based upon said sample based motion modification as a result of said applying said optical flow between said temporally previous reference slice and said temporally future reference slice.

2. A method of encoding a video included in a bitstream by an encoder, comprising:

(a) providing said bitstream indicating how a coding tree unit was partitioned into coding units according to a quad tree plus multi tree structure that allows a square parent node to be split with a quaternary tree partitioning that splits said square parent node in half in both horizontal and vertical directions to define leaf nodes that are square in shape each of which are the same size, wherein said quad tree plus multi tree structure allows each of said leaf nodes to be split based upon one selected from a group consisting of,
  (i) a symmetric binary tree partitioning that splits one of said leaf nodes of said quaternary tree partitioning in half in either a horizontal direction or a vertical direction resulting in two blocks that are the same size as leaf nodes, and
  (ii) an asymmetric tree partitioning that splits one of said leaf nodes of said quaternary tree partitioning in either a horizontal direction or a vertical direction resulting in three blocks two of which are different in size than a third one of said three blocks as leaf nodes;

(b) wherein said bitstream is configured for identifying final coding units to be decoded represented by leaf nodes of the quad tree plus multi tree structure;

(c) wherein a plurality of said final coding units are rectangular coding units included in a bi-predictive B-slice of a current frame of said video;

(d) wherein said bitstream is configured for providing a first motion vector associated with said coding unit of said bi-predictive B-slice of said current frame of said video referencing a temporally previous reference slice of a temporally previous reference frame relative to said current frame of said coding unit;

(e) wherein said bitstream is configured for providing a second motion vector associated with said coding unit of said bi-predictive B-slice of said current frame of said video referencing a temporally future reference slice of a temporally future reference frame relative to said current frame of said coding unit;

(f) wherein said bitstream is configured for applying an optical flow between said temporally future reference slice and said temporally previous reference slice to perform a sample based motion modification using a corrective motion vector applied to predicted arrays based upon at least one of said second motion vector and said first motion vector; and (g) wherein said coding unit is configured to be based upon said sample based motion modification as a result of said applying said optical flow between said temporally previous reference slice and said temporally future reference slice.

3. A bitstream of compressed video data for decoding by a decoder, including a non-transitory computer readable storage medium storing the compressed video data, the bitstream comprising:

(a) said bitstream containing data indicating how a coding tree unit was partitioned into coding units according to a quad tree plus multi tree structure that allows a square parent node to be split with a quaternary tree partitioning that splits said square parent node in half in both horizontal and vertical directions to define leaf nodes that are square in shape each of which are the same size, wherein said quad tree plus multi tree structure allows each of said leaf nodes to be split based upon one selected from a group consisting of,
  (i) a symmetric binary tree partitioning that splits one of said leaf nodes of said quaternary tree partitioning in half in either a horizontal direction or a vertical direction resulting in two blocks that are the same size as leaf nodes, and
  (ii) an asymmetric tree partitioning that splits one of said leaf nodes of said quaternary tree partitioning in either a horizontal direction or a vertical direction resulting in three blocks two of which are different in size than a third one of said three blocks as leaf nodes;

(b) said bitstream containing data identifying final coding units to be decoded represented by leaf nodes of the quad tree plus multi tree structure;

(c) wherein a plurality of said final coding units are rectangular coding units included in a bi-predictive B-slice of a current frame of said video;

(d) said bitstream containing data indicating a first motion vector associated with said coding unit of said bi-predictive B-slice of said current frame of said video referencing a temporally previous reference slice of a temporally previous reference frame relative to said current frame of said coding unit;

(e) said bitstream containing data indicating a second motion vector associated with said coding unit of said bi-predictive B-slice of said current frame of said video referencing a temporally future reference slice of a temporally future reference frame relative to said current frame of said coding unit;

(f) said bitstream containing data indicating an optical flow between said temporally future reference slice and said temporally previous reference slice to perform a sample based motion modification using a corrective motion vector applied to predicted arrays based upon at least one of said second motion vector and said first motion vector; and (g) said bitstream containing data indicating said coding unit based upon said sample based motion modification as a result of said applying said optical flow between said temporally previous reference slice and said temporally future reference slice.

* * * * *